US008464981B2

United States Patent
Goldie et al.

(10) Patent No.: US 8,464,981 B2
(45) Date of Patent: Jun. 18, 2013

(54) UNMANNED AERIAL VEHICLE(UAV) RECOVERY SYSTEM

(75) Inventors: James Goldie, Lexington, MA (US); Nicholas Vitale, Albany, NY (US); George A. Downey, Arlington, MA (US); Kevin Leary, Hamilton, MA (US); William Hafer, College Station, TX (US)

(73) Assignee: Infoscitex Corporation, Waltham, MA (US)

( * ) Notice: Subject to any disclaimer, the term of this patent is extended or adjusted under 35 U.S.C. 154(b) by 378 days.

(21) Appl. No.: 12/931,230

(22) Filed: Jan. 26, 2011

(65) Prior Publication Data

US 2012/0187243 A1 Jul. 26, 2012

(51) Int. Cl.
*B64F 1/00* (2006.01)
(52) U.S. Cl.
USPC ............... 244/110 E; 244/110 G; 244/110 C
(58) Field of Classification Search
USPC .................. 244/110 E, 110 G, 110 C, 110 D
See application file for complete search history.

(56) References Cited

U.S. PATENT DOCUMENTS

| 5,266,799 | A | * | 11/1993 | Steinitz et al. | 250/253 |
| 7,143,976 | B2 | | 12/2006 | Snediker et al. | |
| 7,264,204 | B1 | | 9/2007 | Portmann | |
| 7,410,125 | B2 | | 8/2008 | Steele | |
| 7,611,094 | B2 | * | 11/2009 | Rom | 244/110 C |
| 7,798,445 | B2 | * | 9/2010 | Heppe et al. | 244/110 E |
| 8,162,256 | B2 | * | 4/2012 | Goossen et al. | 244/110 E |
| 2007/0023568 | A1 | * | 2/2007 | Rom | 244/48 |
| 2012/0032025 | A1 | * | 2/2012 | Allen et al. | 244/110 C |

* cited by examiner

*Primary Examiner* — Christopher P Ellis
(74) *Attorney, Agent, or Firm* — Iandiorio Teska & Coleman, LLP

(57) ABSTRACT

A UAV recovery system including a recovery cart; a guide mechanism for defining the path of the cart; a base station for capturing a UAV tailhook; a momentum transfer system driven by the inertia of the UAV through the arresting member to move the recovery cart along the guide mechanism away from the base station in the same direction as the UAV; an acceleration control device for converging the speeds and positions of the UAV and cart for enabling engagement of the cart and UAV as their relative speeds approach zero; and a brake system for stopping the recovery cart when the cart and UAV are engaged. Also disclosed is a UAV having a tailhook pivotably mounted on the UAV at the center of gravity of the UAV.

23 Claims, 14 Drawing Sheets

UNMANNED AERIAL VEHICLE(UAV) RECOVERY SYSTEM

GOVERNMENT RIGHTS

This application was made with U.S. Government support under U.S. Navy Contract No. N00167-007-C-0006. The Government may have certain rights under the subject invention.

FIELD OF THE INVENTION

This invention relates to an improved unmanned aerial vehicle (UAV) recovery system.

BACKGROUND OF THE INVENTION

Unmanned aerial systems (UAS's) including UAV's or remotely piloted vehicles (RPV's) and control and recovery systems are a fast expanding technology. Recovery of UAV's using a UAV recovery system is a difficult task which must be done with great care and precision to avoid damage to the UAV. A UAV which may weigh 50 pounds or more and be traveling at 35 mph or more must be stopped and landed without damaging the UAV or placing harmful deceleration loads or contact loads on non-structural or low-load UAV components or surfaces. In addition, imparting high instantaneous peak forces to the UAV at the moment of contact with the recovery hardware must be avoided. This is further complicated when the recovery must be effected on a ship where space is limited and the ship superstructure must be avoided to prevent damage to the UAV and the ship superstructure. Present approaches include a net which the UAV flies into and is snagged or a line which the UAV snags with its wing tip. In those instances, the net or line is hung above the deck or over the side: not an optimum configuration for a sea-going vessel.

SUMMARY OF THE INVENTION

It is therefore an object of this invention to provide an improved UAV recovery system useable on land, at sea, or in the air.

It is a further object of this invention to provide such an improved UAV recovery system which decelerates the UAV to a speed of zero without damaging the UAV; without placing harmful deceleration loads or contact loads on non-structural or low-load UAV components or surfaces; and without imparting high instantaneous peak forces to the UAV at the moment of contact with the recovery hardware.

It is a further object of this invention to provide such an improved UAV recovery system which decelerates the UAV using its inertia to position a recovery cart to receive the UAV.

It is a further object of this invention to provide such an improved UAV recovery system which can be set so that the UAV settles on the recovery cart as their speeds synchronize so that their relative speed is zero or virtually so.

It is a further object of this invention to provide such an improved UAV recovery system which can be applied shipboard using limited space and avoiding ship superstructure enabling missed approaches and go-grounds to be safely executed.

It is a further object of this invention to provide such an improved UAV recovery system which is light and allows quick setup and take down and stowage as opposed to a permanently placed system.

The invention results from the realization that an UAV can be decelerated and its own loss of momentum can be used to move a recovery cart under the UAV using an acceleration control device for converging the speeds and positions of the UAV and enabling engagement of the cart and UAV as their relative speeds approach zero and then braking the recovery cart to a stop when the UAV and recovery cart are engaged.

The subject invention, however, in other embodiments, need not achieve all these objectives and the claims hereof should not be limited to structures or methods capable of achieving these objectives.

The details of one or more embodiments are set forth in the accompanying drawings and the description below. Other features, objects, and advantages will be apparent from the description and drawings, and from the claims. It is also important to note that the present embodiments are not limited to the exemplary or primary embodiments described herein. Modifications and substitutions by one of ordinary skill in the art are considered to be within the scope of the present embodiments, which is not to be limited except by the claims.

This invention features a UAV recovery system including a recovery cart, a guide mechanism for defining the path of the cart, and a base station including an arresting member for capturing a UAV tailhook. A drive system is driven by the inertia of the UAV through the arresting member to move the recovery cart along the guide mechanism away from the base station in the same direction as the UAV. An acceleration control device converges the speeds and positions of the UAV and cart for enabling engagement of the cart and UAV as their relative speeds approach zero, and a brake system stops the recovery cart when the cart and UAV are engaged.

In a preferred embodiment the recovery system may be installed on a ship and it may be installed cross-wise, between the starboard and port sides of the ship. The cart may include a compliant surface for engaging the UAV. The compliant surface may include a net. The cart may include a damper system for cushioning the engagement of the UAV with the cart. The damper system may include a compressible medium. The compressible medium may be within a vented deflatable enclosure. The cart may include a collapsible recovery frame for supporting the compliant surface. The cart may include wing support rigging. The cart may include a main frame with wheels. The guide mechanism may include at least one guide link extending between the base station and a remote ground mount and at least one follower on the cart for guiding on the guide link. The guide link may include a cable. The momentum transfer system may include a drive link connected with the arresting member around at least one direction changing mechanism in the base station and at least one direction changing mechanism in the remote ground mount and connected to the cart for drawing the cart forward away from the base station by the inertia of and in the same direction as the UAV. The drive link may include a cable and the direction changing mechanism may include pulleys. The arresting member may include a loop of cable. The acceleration control device may include an adjustable brake mechanism on the cart for engaging the drive link. The adjustable brake mechanism may include a reel and a brake member and a brake pad for bearing against the brake member to control release of the drive link. The drive link may include a cable and the reel may include a cable reel. The brake system may include a brake link connected to the cart and a reel and a brake member and a brake pad for bearing against the brake member to control release of the brake link. The brake link may include a cable and the reel may include a cable reel. The recovery system may be installed on an airplane.

The invention also features a UAV system including a UAV and a UAV recovery system. There is a UAV having a tailhook pivotably mounted on the UAV at the center of gravity of the UAV. There is a recovery cart and a guide mechanism for defining the path of the cart. There is a base station including an arresting member for capturing a UAV tailhook and a momentum transfer system is driven by the inertia of the UAV through the arresting member to move the recovery cart along the guide mechanism away from the base station in the same direction as the UAV. An acceleration control device converges the speeds and positions of the UAV and cart for enabling engagement of the cart and UAV as their relative speeds approach zero. A brake system stops the recovery cart when the cart and UAV are engaged.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
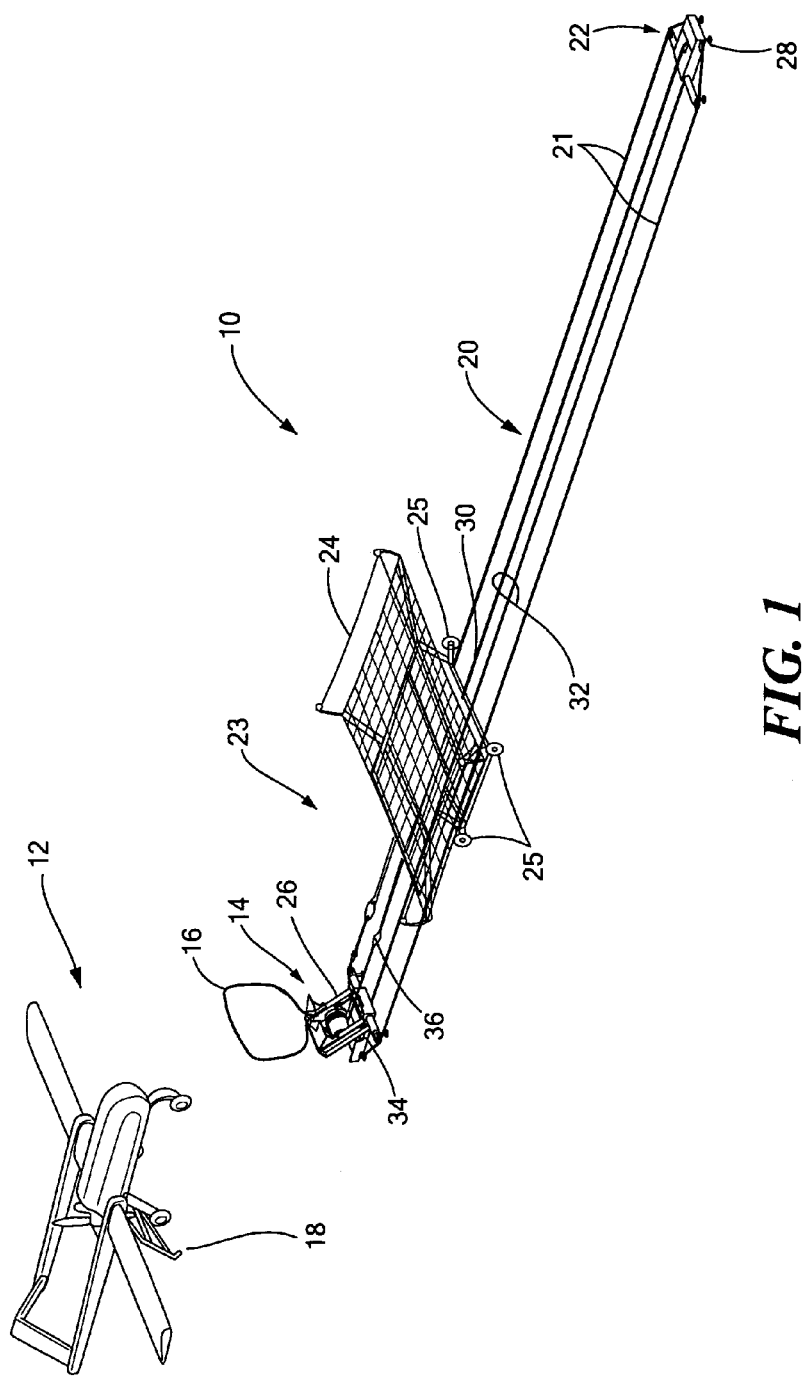
FIG. 1 is a three dimensional schematic view of a UAV and UAV recovery system according to one embodiment of this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer. For example, the present invention may be used on land at a base, at sea on a ship, or in the air on an airplane.

There is shown in FIG. 1 a UAV recovery system 10 and a UAV 12. Recovery system 10 includes a base station 14 with an arresting member 16 for capturing the tailhook 18 of UAV 12. Recovery system 10 also includes a guide mechanism 20 including guide links 21 extending between base station 14 and remote ground mount 22 for guiding the motion of cart 24 as it moves on wheels 25 between base station 14 and remote ground mount 22. A momentum transfer mechanism 23, driven by the inertia of UAV 12 through arresting member 16, includes a direction changing mechanism 26 in base station 14 and another direction changing mechanism 28 in remote ground mount 22 which transfers the momentum of the incoming UAV 12 to be recovered to the cart 24 through acceleration control device 30. The inertia of the incoming UAV is applied through arresting member 16 and the momentum transfer mechanism 23 to move cart 24 along guide links 21 in the same direction as UAV 12 from base station 14 to remote ground mount 22 by means of drive link 32 in momentum transfer mechanism 23. A brake system 34, a portion of which is mounted in base station 14 and includes brake link 36, is used to stop the recovery cart 24 when the cart 24 and the UAV 12 are traveling at a common speed. The horizontal window for the recovery system is determined by the width of the arresting member 16. Its width can not be unlimited, because the UAV has to land on the cart 24. The height of the arresting member should also be sufficient to accommodate the lowest possible landing. The bottom of the tailhook should not be allowed to hook the lower end of the arresting member. The recovery system may be installed on a land base, an airplane, or a ship.

Figure 2:
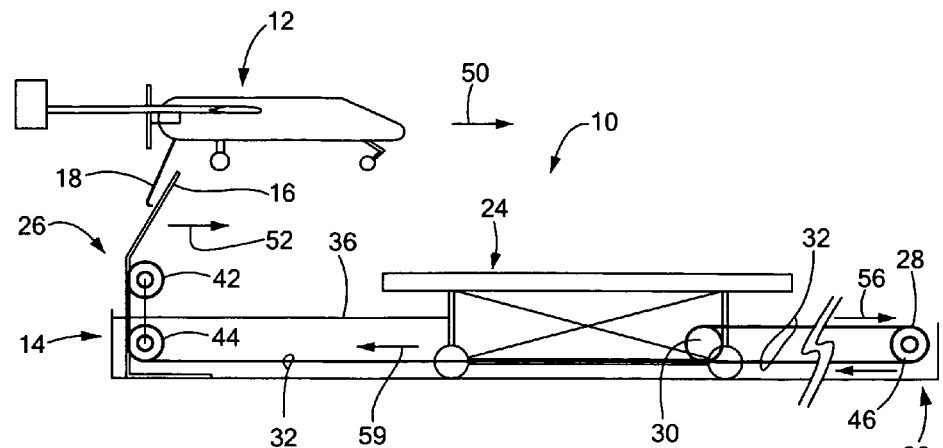
FIG. 2 is a schematic side elevational view showing the UAV arresting member, cart, momentum transfer mechanism, and brake system.

The operation of recovery system 10 may be more easily understood with reference to the schematic drawing in FIG. 2 where direction changing mechanism 26 in base station 14 and direction changing mechanism 28 in remote ground mount 22 are shown in more detail. In this case assuming that drive link 32 is a cable, the direction changing mechanism 26 may include pulleys such as pulleys 42 and 44 and the direction changing mechanism 28 may include pulley 46. In operation, as UAV 12 approaches, moving in the direction of arrow 50, its tailhook 18 engages arresting member 16 and pulls it in the same direction as indicated by arrow 52. Arresting member 16 which may itself be a loop of cable is attached to or integral with drive link or cable 32. The movement of cable 32 around pulley 42 and 44 changes the direction imparted so that now the arresting member 16 moving forward in the direction of arrow 52 imparts a motion to link 32 in the reverse direction as indicated by arrow 54. However, cable 32 continues on to ground mount 22 where its direction is reversed again by pulley 46 so that now cable 32 is moving in the direction of arrow 56. The end of link or cable 32 is attached to cart 24 either directly or in accordance with the preferred embodiment of this invention to an acceleration control device 30. Thus, as UAV 12 moves forward in the direction of arrow 50 the end of link or cable 32 moves cart 24 in the same direction so that the inertia of UAV 12 is used to move the cart in the same direction and at the same time the inertia of cart 24 acts to gently slow the UAV 12 so that UAV 12 both reaches the same speed as cart 24 and does so, when it is directly over the desired landing location on cart 24.

Figure 3:
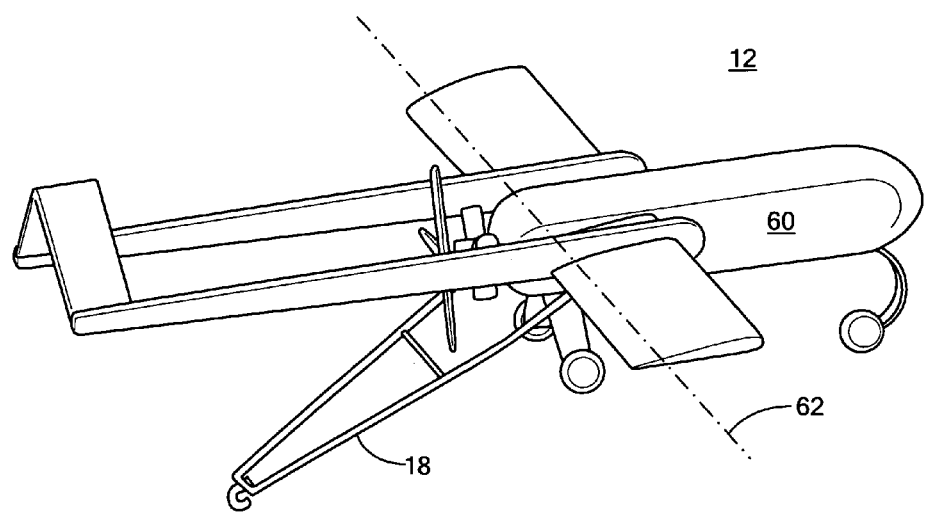
FIG. 3 is a three dimensional top diagrammatic view of a UAV usable with this embodiment of the invention.

UAV 12, FIG. 3, has its tailhook 18 pivotably attached to the body 60 of UAV 12 at or near its center of gravity whose axis is indicated at 62. Attachment forward of that point would cause UAV 12 to "nose down" when the tension of arrest member 16 is brought to bear. Attachment behind the center of gravity would cause UAV to assume a tail down pitch and either the nose in or tail down pitch would be detrimental to a soft gentle capture. Whether the UAV will pitch down or up depends also on the height of the attachment relative to the center of gravity, as well as the fore and after position. There are other positions for placement of the pivot attachment that will avoid pitching up or down. This may be important, if the tailhook cannot be attached at the center of gravity (CG) for practical reasons.

Figure 4:
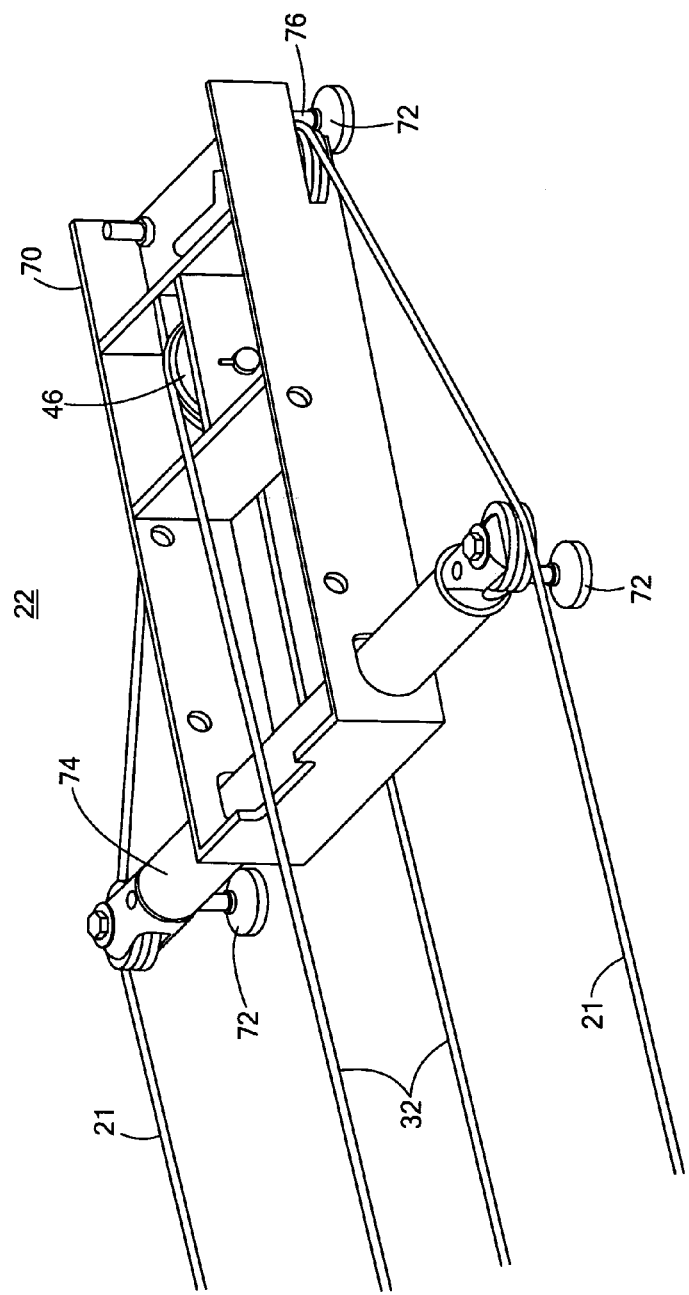
FIG. 4 is an enlarged detailed view with parts removed of a remote ground mount according to an embodiment of this invention.

Remote ground mount 22, FIG. 4, includes a frame 70 which sits on adjustable feet 72, two of which extend from spreader 74 that serves to spread and tension guide links 20 which extend around and behind remote ground mount 22 on pulleys 76 only one of which is shown. Remote ground mount 22 also includes the direction reversing mechanism 28, pulley 46 which carries drive link 32.

Figure 5:
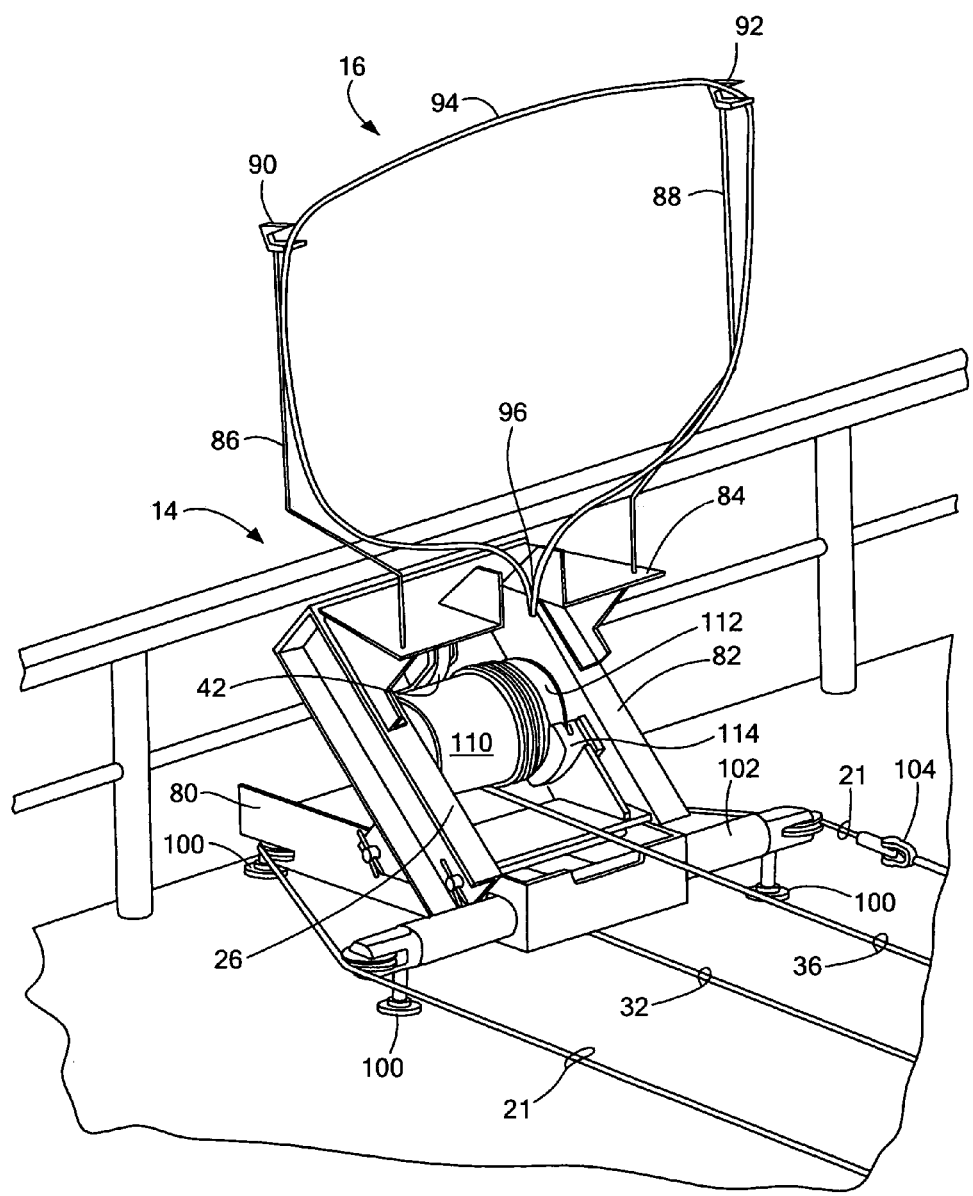
FIG. 5 is an enlarged more detailed three dimensional view with parts removed of the base station and arrest member.
Figure 6:
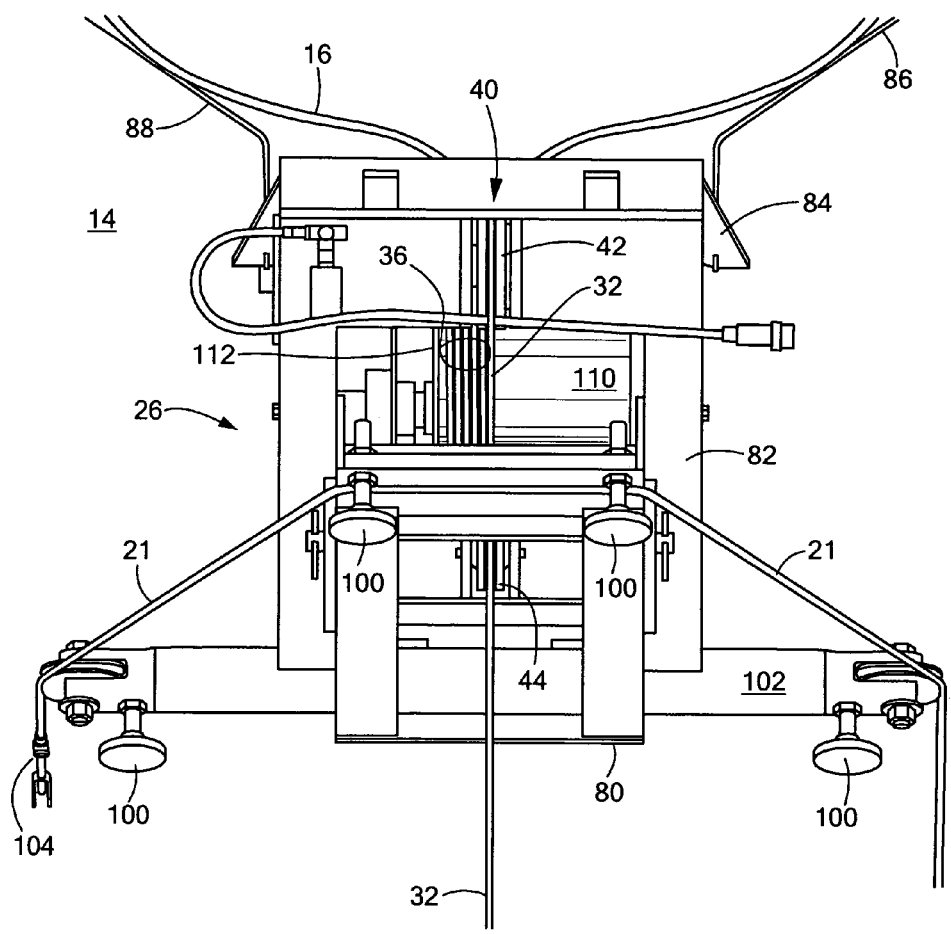
FIG. 6 is an enlarged three dimensional bottom rear view of the base station with parts removed.

Base station 14, FIGS. 5 and 6, includes a base 80, frame 82 and deck 84. Base 80 includes four adjustable feet 100 and a spreader 102 for spacing and tensioning guide cables 21. Deck 84 carries arms 86 and 88 which have forks 90, 92 to support arrest member 16, shown as cable loop 94, in position to snag tailhook 18. Note that guide cable 21 includes a turn buckle 104 or other tensioning device for the guide cables 21 which may be tensioned at 2000 pounds or more, especially if the recovery system is used on the deck of a ship. Brake system 26 is shown in more detail where the link is a flexible link or cable 36 which is wrapped around a cable reel or drum 110. Drum 110 has an enlarged flange 112 on one end which functions as a disk and engages the disk brake caliper 114 so that the proper amount of braking power can be applied to stop cable 36 and thus cart 24 when the cart and UAV are engaged.

The goal of the recovery system according to this invention is to capture the UAV and bring it down to a soft landing applying the minimum G forces both vertical and horizontal to the UAV below the level which would cause any damage and within the distance allotted for the cart travel. For example, assuming with a known weight usually between 50 and 350 pounds of the UAV and a known approach speed the distance available for the recovery, for example 57 feet, and the load on the momentum transfer cable 32 from cart 24, the forces applied by brake system 26 and acceleration control device 30 are set so that UAV 12 is brought down to gently engage cart 24 when their speeds are converged and their relative speed is zero and within a distance of e.g., 57 feet provided by the system. This is calculated as follows. The peak arrest force applied to the UAV is minimized by the recovery system by maintaining it at a constant level over the duration of the recovery. Assuming that the arrest force is maintained at a constant level, the necessary arrest force F to bring a UAV approaching at velocity v to a stop within a given available distance D is uniquely determined by $$F = \frac{Mv^2}{2D}.$$

The distance D that can be allotted to recovery of the UAV 12 is somewhat less than the available deck space (with no recovery system present) by the (1) distance from the approach end of the deck to the arresting member 16, (2) the distance necessary for the arrest cable to pay out and become taut, (3) the deck space consumed by the remote ground mount 22, and (4) the horizontal distance from the forward-most point of the UAV 12 to the point on the tailhook 18 that snags the arresting member 16. If, for example, 19 feet is deducted from the 57 feet to arrive at an allotted length of D=38 feet, then for M=326 lbm and v=68 knots (115 ft/s), the required arrest force F is 1825 lbs.

Cart 24 is finally stopped by brake system 26 when UAV 12 and cart 24 are engaged. The acceleration control device insures that cart 24 and UAV 12 will reach a relative velocity of zero within the allotted distance and then the cart brake will apply a brake force to stop cart 24 and UAV 12. The UAV and cart will become engaged and will come to a stop together.

Figure 7:
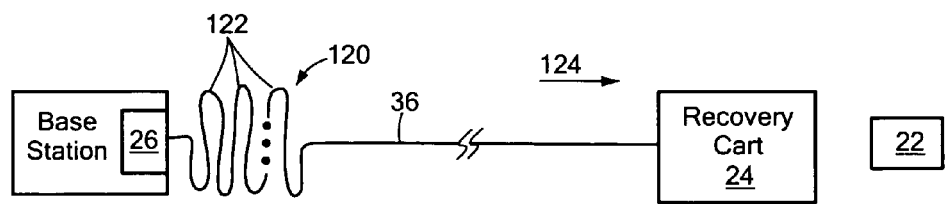
FIG. 7 is a schematic block diagram illustrating one implementation of the Cart brake system.

The notion is to assure that recovery cart 24, FIG. 7, goes as far as required but no more and within the distance allotted by the system before reaching the remote ground mount 22. The tension can be set on brake system 26 to apply a constant braking force shortly after the UAV 12 and cart 24 have reached a common speed. Since the distance at which a common speed will occur is known, one approach is to pay out sufficient line 120 to place the cart at its starting position, pay out an additional portion of line 120 to create the needed slack in the line 120 such that it becomes taut when the cart 24 has reached the position on deck where it and the UAV are traveling at the same speed, and then set brake system 26 to the proper braking force. In order to prevent the cart 24 from rolling forward prior to recovery of the UAV 12, the payed out portion or "slack" in the line 120 may be, for example, held together by weak ties 122. The motion of recovery cart 24 in the direction of arrow 124 eventually puts a tension on brake cable 36 which breaks ties 122 but still allows recovery cart 24 to move forward freely until the slack in line 120 is exhausted. Then when the tension occurs on cable 36 the brake force set on brake 26 applies and stops the recovery cart.

Although thus far the guide mechanism 20 has been indicated as using links which are flexible in fact cable, this is not a necessary limitation of the invention. Likewise although the momentum transfer mechanism 23 includes a flexible link, again a cable, this too is not a limitation of the invention. And finally, the brake system 26 is also shown with a flexible link or cable but this is not a limitation of the invention. The links may be other types of flexible links such as chain or they may be rigid links. The guide mechanisms 20 use flexible links but could use rigid links such as tracks or grooves, which may be more desirable in some embodiments, for example, when the system is used on shipboard. The use of taut cables (rather than say tracks, grooves or other guideways) was chosen to allow users to erect and take down the recovery system easily. The user may not want significant permanent recovery system components on the deck. Cables can be more easily coiled up and stowed over other components.

Throughout this specification like parts have been given like numbers and similar parts like numbers accompanied by a lower case letter or letters.

Figure 8:
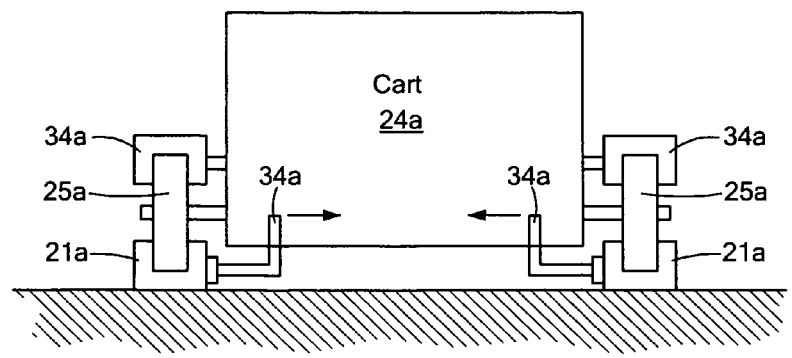
FIGS. 8, 9, and 10 are schematic elevational views showing three alternative techniques for implementing a brake system according to an embodiment of this invention.
Figure 9:
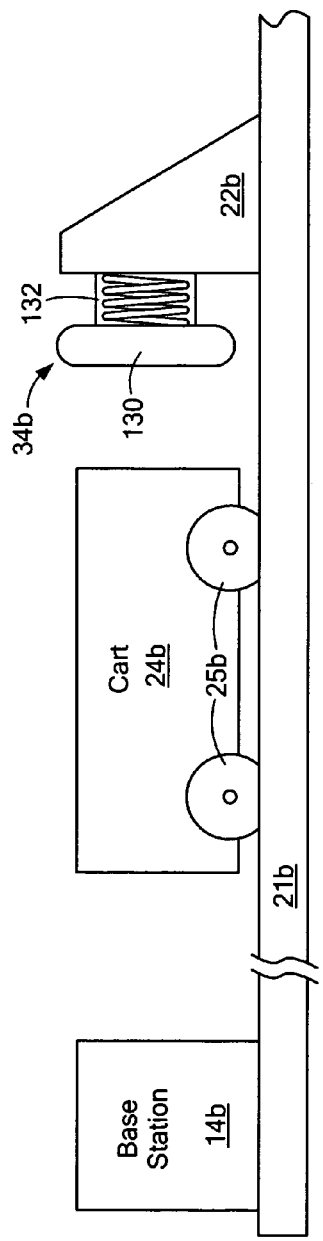
Figure 10:
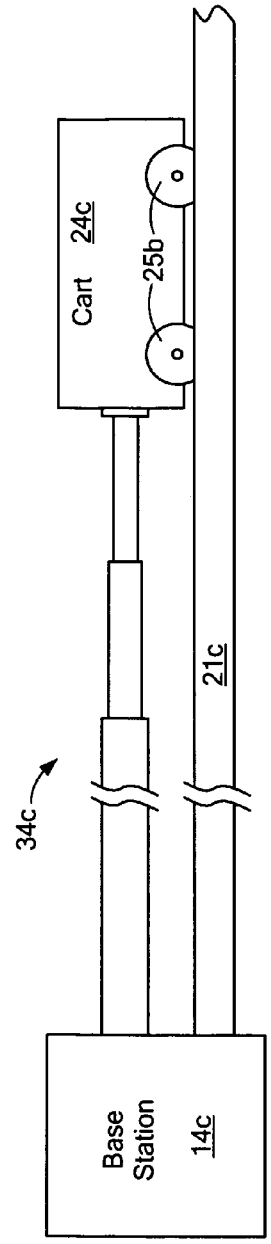

In FIG. 8, cart 24a has its wheels 25a engaged in channels 21a and for braking it may use conventional type caliper or drum brakes 34a that apply braking force directly to wheels 25a or there may be braking mechanisms such as 34aa, which apply braking force between cart 24a and the channels or guides 21a. In FIG. 9 brake 34b is shown as implemented with a large bumper 130 mounted via a spring 132 to remote ground mount 22b. Brake system 26c may include a telescopic cylinder arrangement 34c, FIG. 10, which extends easily with cart 24c until the defined distance is reached at which point the fluid pressure e.g. pneumatic pressure is changed to stop cart 24.

Figure 11:
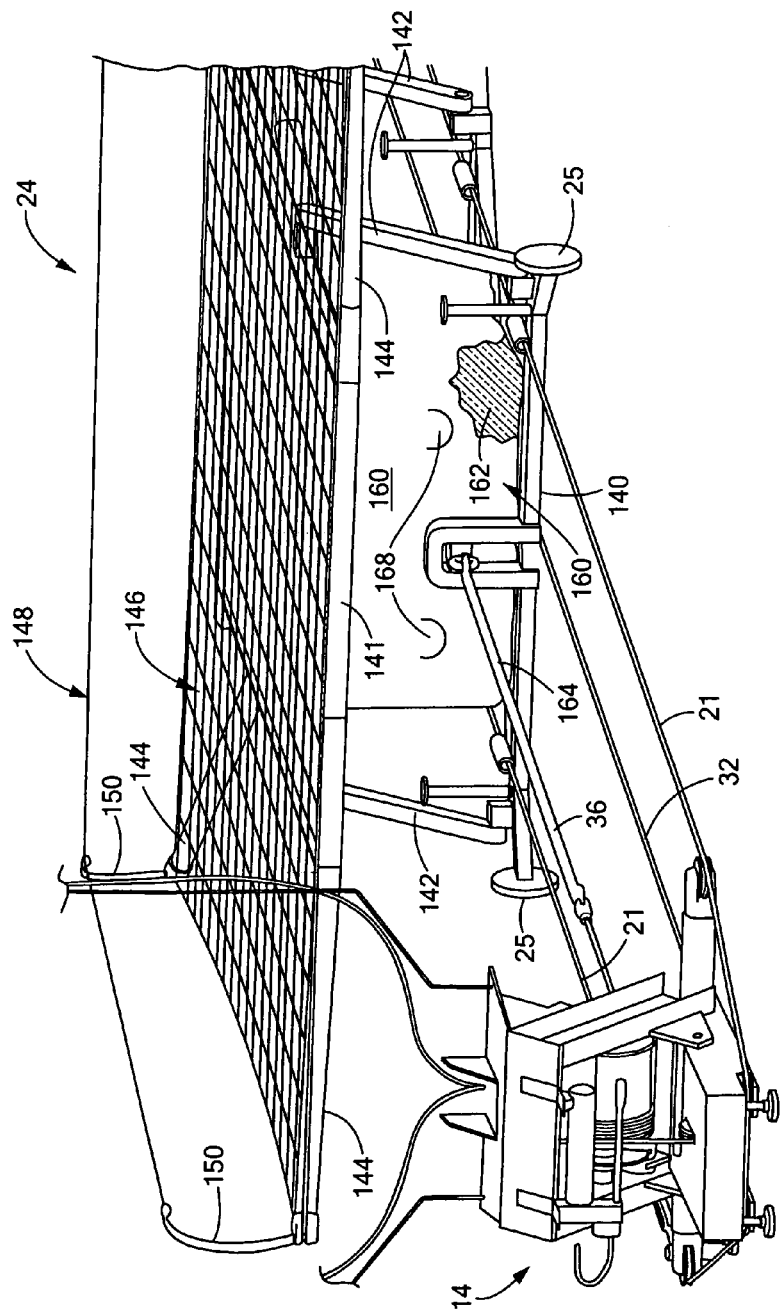
FIG. 11 is a three dimensional rear view of the cart and base station.
Figure 12:
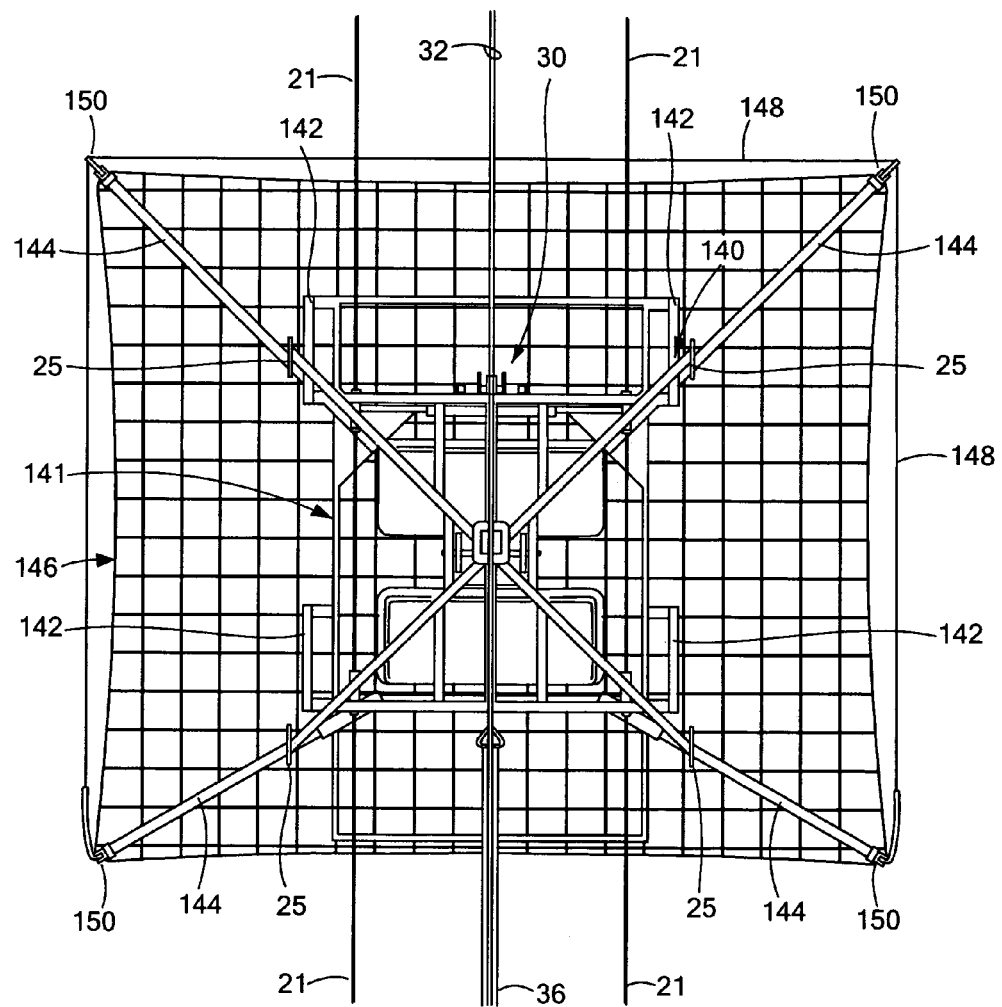
FIG. 12 is a bottom view of the cart.

Cart 24, FIGS. 11 and 12, includes a base frame or chassis 140 which carries wheels 25 and supports a collapsible recovery frame 141 including vertical links 142 and spreaders 144. Spreaders 144 support a compliant surface, for example, net 146 which may be a nylon mesh, they also support a wing support rigging 148 which extends around the two sides and the forward edge of cart 24 held up by standoffs 150. Also mounted on chassis 140 beneath compliant surface 146 is a damper system 160 which cushions the engagement of UAV 12 with cart 24. Damper system 160 may include a compressible medium such as polyurethane foam 162 in a vented deflatable enclosure such as bag or bladder 164 which is broken away at 166 to show polyurethane interior foam 162. There are also provided valves in the form of flaps 168 at numerous places around deflatable enclosure 164 to allow the air to escape momentarily when the UAV lands on the compliant surface or nylon net 146 and collapses the four bar linkage comprised of vertical links 142, chassis 140, and recovery frame 141. The weight of the UAV and its momentum momentarily collapses the entire system and then the bags with the polyurethane foam cores recover and the compliant surface rises to a final position. Cart 24 has followers 169 such as tubes 171 which glide on guide cables 21.

Figure 13:
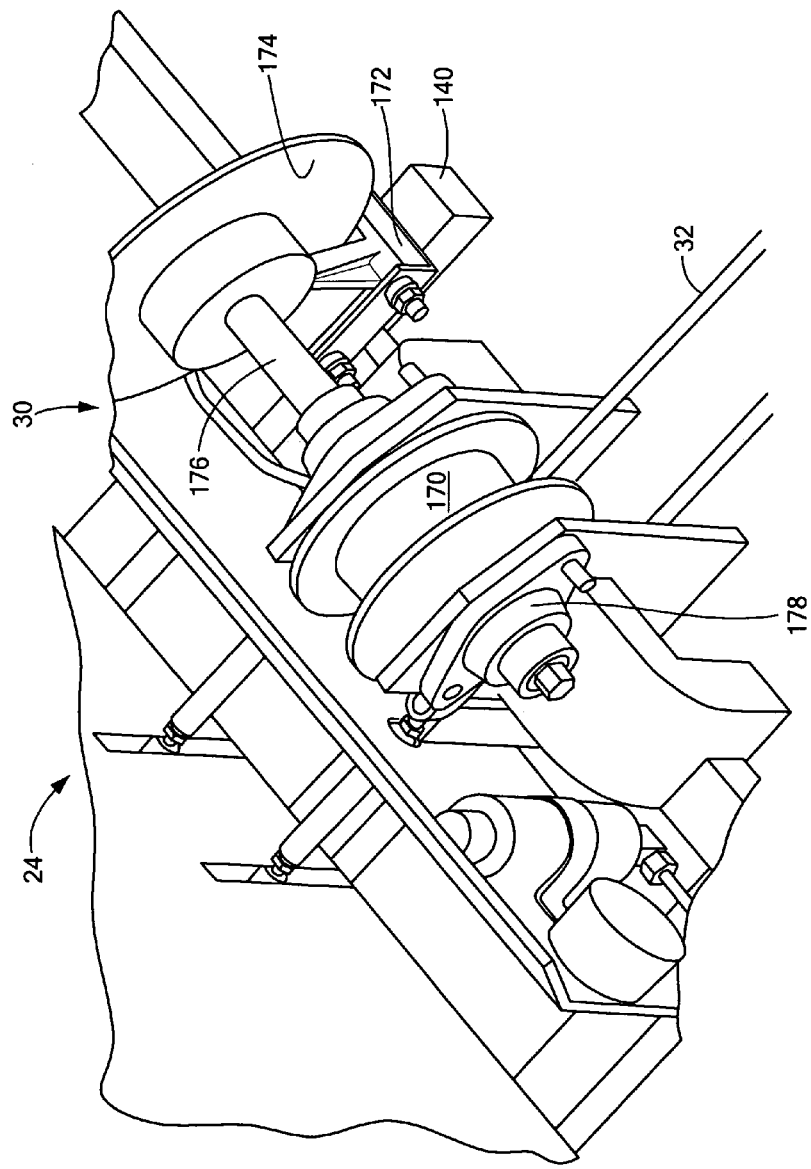
FIG. 13 is a three dimensional enlarged detailed view of the momentum transfer mechanism portion mounted on the cart.

Acceleration control device 30 shown in FIG. 13 on cart 24 is used to control the motion of cart 24 under the force of the momentum transfer from UAV 12. In this specific embodiment, the employing of cable 32 may be by a cable reel 170 to pay out cable 32 at a tension controlled by the force of brake caliper 172 applied to brake disc 174 so that speed of cart 24 converges with the speed of the incoming UAV within the available distance. Brake disc 174 is fixed to shaft 176, which is also fixed to reel 170 and is mounted in bearing 178.

Figure 14:
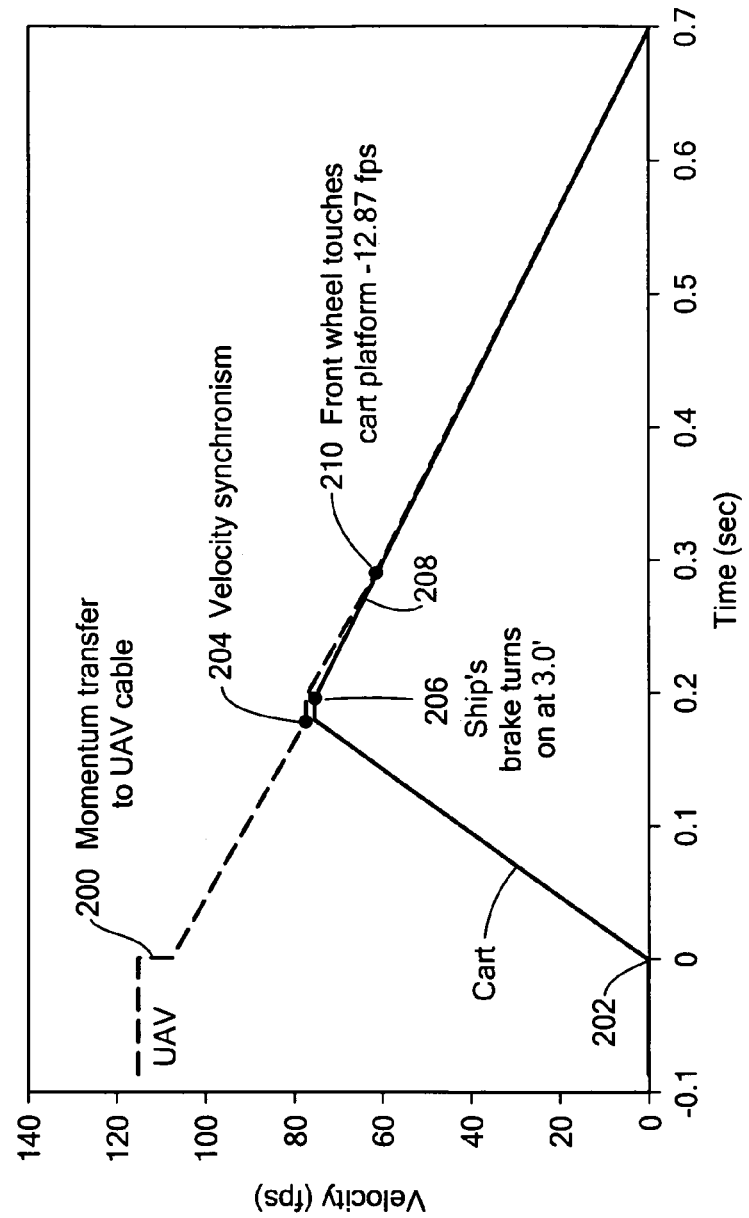
FIG. 14 shows the simulated velocity versus time characteristics for the UAV and the cart during a recovery operation.
Figure 15:
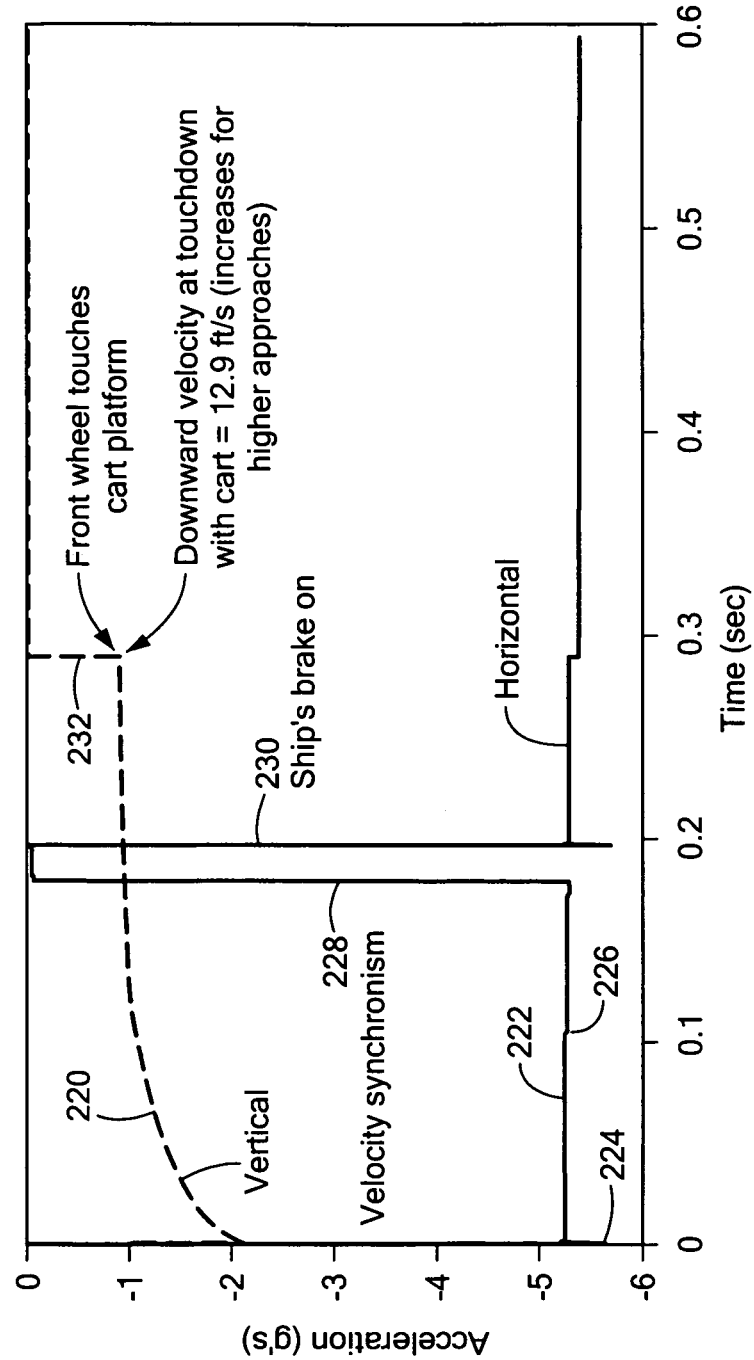
FIG. 15 shows the simulated acceleration characteristics of the UAV during the recovery time.
Figure 16:
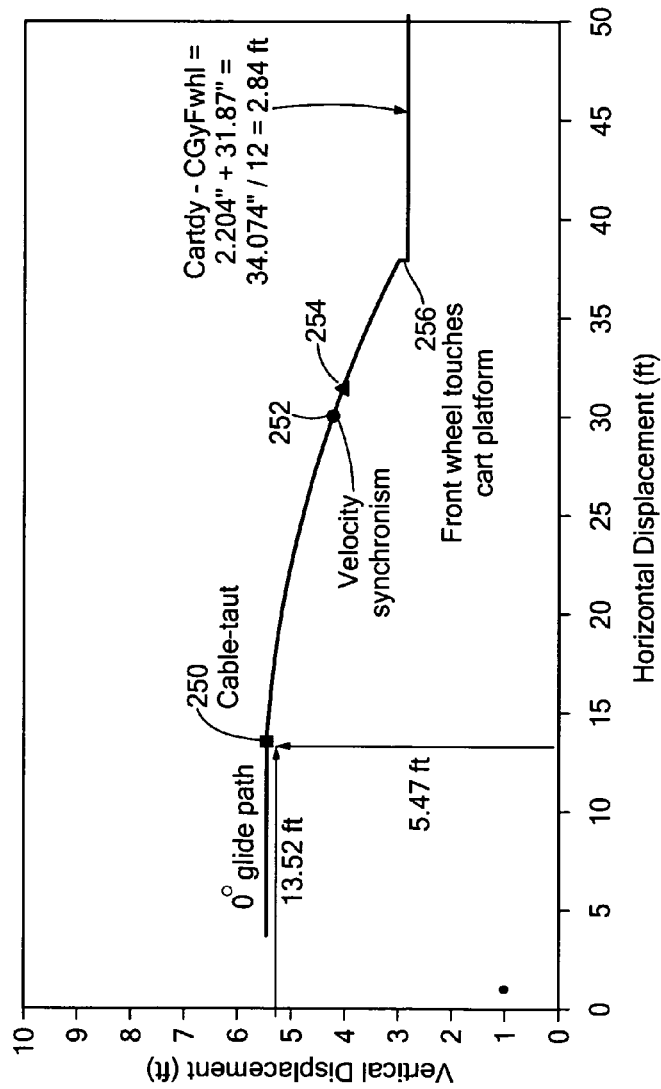
FIG. 16 illustrates the simulated trajectory of a UAV during recovery.
Figure 17:
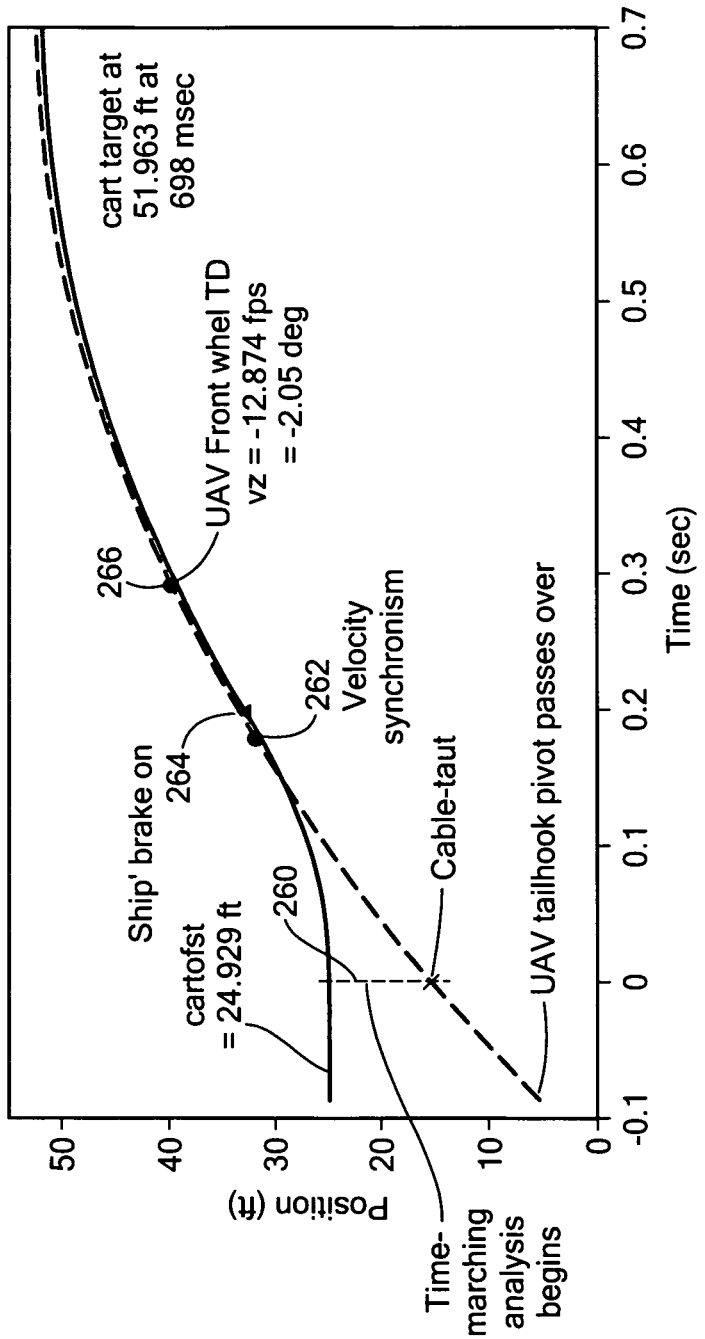
FIG. 17 illustrates the simulated horizontal position over time of the cart and the UAV.

The forces and the mechanics of the physics involved to bring UAV to a gentle engagement with cart 24 within the distance available and with the assurance that when the cart and UAV speeds converge, the cart will truly be in position beneath the UAV to receive and engage it. This is accomplished as explained earlier and is explained more graphically in FIGS. 14-17. FIGS. 14-17 are simulations not actual performance data. FIG. 14 shows a plot of the velocity versus time for both the cart 24 and the UAV 12. Before the UAV tailhook engages the arrestor member or loop and for a short period thereafter, the UAV continues at its constant velocity and the cart remains stationary. When the UAV has traveled a short distance and the cable is drawn taut momentum is transferred from the UAV to the momentum transfer cable at 200. At an initial time 202 cart 24 begins to move. The momentum of the UAV is being transferred to the cart and so the UAV speed drops and the cart speed increases until the cable between them goes slack and their relative speed is very nearly zero as at 204. The acceleration control device has insured that the convergence of their speeds occurs early enough to be within the available distance allotted by the system. A short distance/time after the relative velocity reaches zero the brake system 26 acts at 206, and the cart with the UAV engaged decelerates along slope 208. At point 210 the front wheels of the UAV 12 touch the cart platform. The tailhook avoids imparting any destabilizing pitch moment that would require counter-action. The accelerations of the UAV are shown in FIG. 15. The acceleration force in G's on the UAV has both a vertical 220 and a horizontal component 222. The horizontal component 222 dips to nearly −6 Gs at 224 when momentum is transferred from the UAV to the momentum transfer cable, then stays fairly constant at 226 until the velocities are synchronized. G loading can be set by design, and must be within aircraft limits. At this point the horizontal Gs approach zero at 228 until the brake is applied, at which point the Gs rise again at 230 to nearly −6 Gs. The trajectory of the UAV during recovery on a typical low approach is shown in FIG. 16. The horizontal component of the trajectory is well under 50 feet. The vertical trajectory drops from over five feet when the momentum is transferred from the UAV to the cable 250. From there the vertical displacement gently drops until the velocity synchronization 252 when the relative velocity between cart and UAV is essentially zero. The curve continues smoothly when the brake is applied 254 and then levels off at a little over two feet vertical at 256, where the front wheel touches the cart platform. The entire operation can take place in less than a second as shown in FIG. 17 where the horizontal position versus time of the cart and the UAV is shown. Initially the cart and UAV are separated by as much as, for example, 20 feet. Their speeds begin to converge when the arrest member has become taut some time after the UAV tailhook has engaged the arrest member, and continue to do so after the point 260 where the momentum is transferred from the UAV to the cart via the cable. They reach a relative velocity of approximately zero at 262 at a little under two tenths of a second. The cart brake is applied 264 at approximately two tenths of a second and finally the UAV front wheels touch down on the cart 266 at barely three tenths of a second after which the cart and UAV continue to slow down at the same rate of deceleration, up to seven tenths of a second.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:
1. A UAV recovery system comprising:
a recovery cart;
a guide mechanism for defining the path of the cart;
a base station including an arresting member for capturing a UAV tailhook;
a momentum transfer system driven by the inertia of the UAV through said arresting member to move the recovery cart along the guide mechanism away from said base station in the same direction as the UAV;
an acceleration control device for converging the speeds and positions of the UAV and cart for enabling engagement of the cart and UAV as their relative speed approaches zero; and
a brake system for stopping the recovery cart when the cart and UAV are engaged.
2. The UAV recovery system of claim 1 in which said recovery system is installed on a ship.
3. The UAV recovery system of claim 2 in which said recovery system is installed cross-wise, between the starboard and port sides of the ship.

4. The UAV recovery system of claim 1 in which said cart includes a compliant surface for engaging the UAV.

5. The UAV recovery system of claim 4 in which said compliant surface includes a net.

6. The UAV recovery system of claim 1 in which said cart includes a damper system for cushioning the engagement of the UAV with said cart.

7. The UAV recovery system of claim 6 in which said damper system includes a compressible medium.

8. The UAV recovery system of claim 7 in which said compressible medium is within a vented deflatable enclosure.

9. The UAV recovery system of claim 4 in which said cart includes a collapsible recovery frame for supporting said compliant surface.

10. The UAV recovery system of claim 1 in which said cart includes wing support rigging.

11. The UAV recovery system of claim 1 in which said cart includes a main frame with wheels.

12. The UAV recovery system of claim 1 in which said guide mechanism includes at least one guide link extending between said base station and a remote ground mount and at least one follower on said cart for guiding on said guide link.

13. The UAV recovery system of claim 12 in which said guide link includes a cable.

14. The UAV recovery system of claim 1 in which said momentum transfer system includes a drive link connected with said arresting member around at least one direction changing mechanism in said base station and at least one direction changing mechanism in said remote ground mount and connected to said cart for drawing said cart forward away from said base station by the inertia of and in the same direction as the UAV.

15. The UAV recovery system of claim 14 in which said drive link includes a cable and said direction changing mechanism includes pulleys.

16. The UAV recovery system of claim 1 in which said arresting member includes a loop of cable.

17. The UAV recovery system of claim 1 in which said acceleration control device includes an adjustable brake mechanism on said cart for engaging said drive link.

18. The UAV recovery system of claim 17 in which said adjustable brake mechanism includes a reel and a brake member and a brake pad for bearing against said brake member to control release of said drive link.

19. The UAV recovery system of claim 18 in which said drive link includes a cable and said reel includes a cable reel.

20. The UAV recovery system of claim 1 in which said brake system includes a brake link connected to said cart and a reel and a brake member and a brake pad for bearing against said brake member to control release of said brake link.

21. The UAV recovery system of claim 20 in which said brake link includes a cable and said reel includes a cable reel.

22. The UAV recovery system of claim 1 in which said recovery system is installed on an airplane.

23. A UAV system including a UAV and a UAV recovery system comprising:
- a UAV having a tailhook pivotably mounted on said UAV at the center of gravity of said UAV;
- a recovery cart;
- a guide mechanism for defining the path of the cart;
- a base station including an arresting member for capturing a UAV tailhook;
- a momentum transfer system driven by the inertia of the UAV through said arresting member to move the recovery cart along the guide mechanism away from said base station in the same direction as the UAV;
- an acceleration control device for converging the speeds and positions of the UAV and cart for enabling engagement of the cart and UAV as their relative speeds approach zero; and
- a brake system for stopping the recovery cart when the cart and UAV are engaged.

* * * * *